(12) United States Patent
Ward et al.

(10) Patent No.: US 7,107,375 B2
(45) Date of Patent: Sep. 12, 2006

(54) METHOD FOR IMPROVING SELECTION PERFORMANCE BY USING AN ARBITRATION ELIMINATION SCHEME IN A SCSI TOPOLOGY

(75) Inventors: Robert E. Ward, Colorado Springs, CO (US); Travis Alister Bradfield, Colorado Springs, CO (US); Gregory A. Johnson, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 509 days.

(21) Appl. No.: 10/437,149

(22) Filed: May 13, 2003

(65) Prior Publication Data

US 2004/0230728 A1 Nov. 18, 2004

(51) Int. Cl.
G06F 13/14 (2006.01)
G06F 13/36 (2006.01)
H04Q 7/24 (2006.01)
H04L 12/62 (2006.01)

(52) U.S. Cl. ....................... 710/107; 710/113
(58) Field of Classification Search ............... 710/107, 710/110, 114, 118, 113, 123, 40.1, 17, 100, 710/240, 244, 313; 327/19; 709/225, 208, 709/253; 370/447, 462; 340/825.5, 825.51; 711/100; 718/101, 104; 719/326

See application file for complete search history.

(56) References Cited

U.S. PATENT DOCUMENTS

| 4,301,379 | A | * | 11/1981 | Reinert | 327/205 |
| 4,785,394 | A | * | 11/1988 | Fischer | 710/114 |
| 5,129,090 | A | * | 7/1992 | Bland et al. | 710/114 |
| 5,237,695 | A | * | 8/1993 | Skokan et al. | 709/225 |
| 5,255,373 | A | * | 10/1993 | Brockmann et al. | 710/117 |
| 5,499,378 | A | * | 3/1996 | McNeill et al. | 703/24 |
| 5,517,626 | A | * | 5/1996 | Archer et al. | 710/110 |
| 5,608,879 | A | * | 3/1997 | Cooke | 710/110 |
| 5,613,076 | A | * | 3/1997 | Latif et al. | 710/113 |
| 5,802,057 | A | * | 9/1998 | Duckwall et al. | 370/408 |
| 5,948,094 | A | * | 9/1999 | Solomon et al. | 710/118 |
| 2004/0230728 | A1 | * | 11/2004 | Ward et al. | 710/107 |

OTHER PUBLICATIONS

"An implementation of a proposed modification of CAN protocol on CAN fieldbus controller component for supporting a dynamic priority policy" by Hasnaoui et al. (abstract only) Publication Date: Oct. 12-16, 2003.*

* cited by examiner

Primary Examiner—Gopal C. Ray
(74) Attorney, Agent, or Firm—Yee & Associates, P.C.

(57) ABSTRACT

An arbitration elimination scheme for a bus. In a preferred embodiment, a programmable counter determines when a SCSI bus idle condition is reached and when a portion of an arbitration window for the bus has passed without participants. If there are no participants for arbitration, the SCSI initiator eliminates arbitration by asserting SEL and issuing initiator/target IDS. If any other device attempts to arbitrate at this time, the device sees SEL asserted and does not attempt to participate in arbitration.

18 Claims, 4 Drawing Sheets

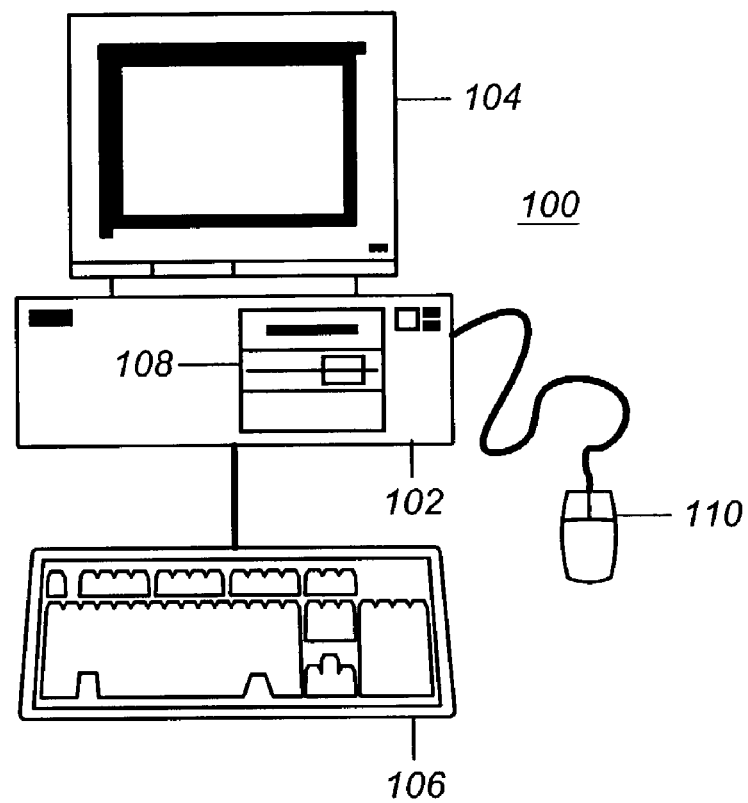
FIG._1
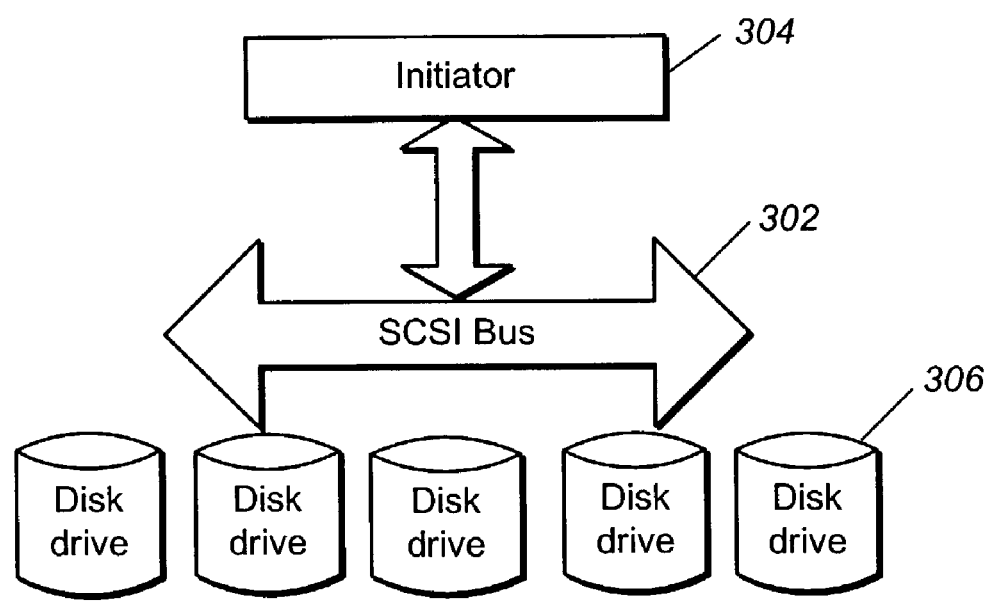
FIG._3

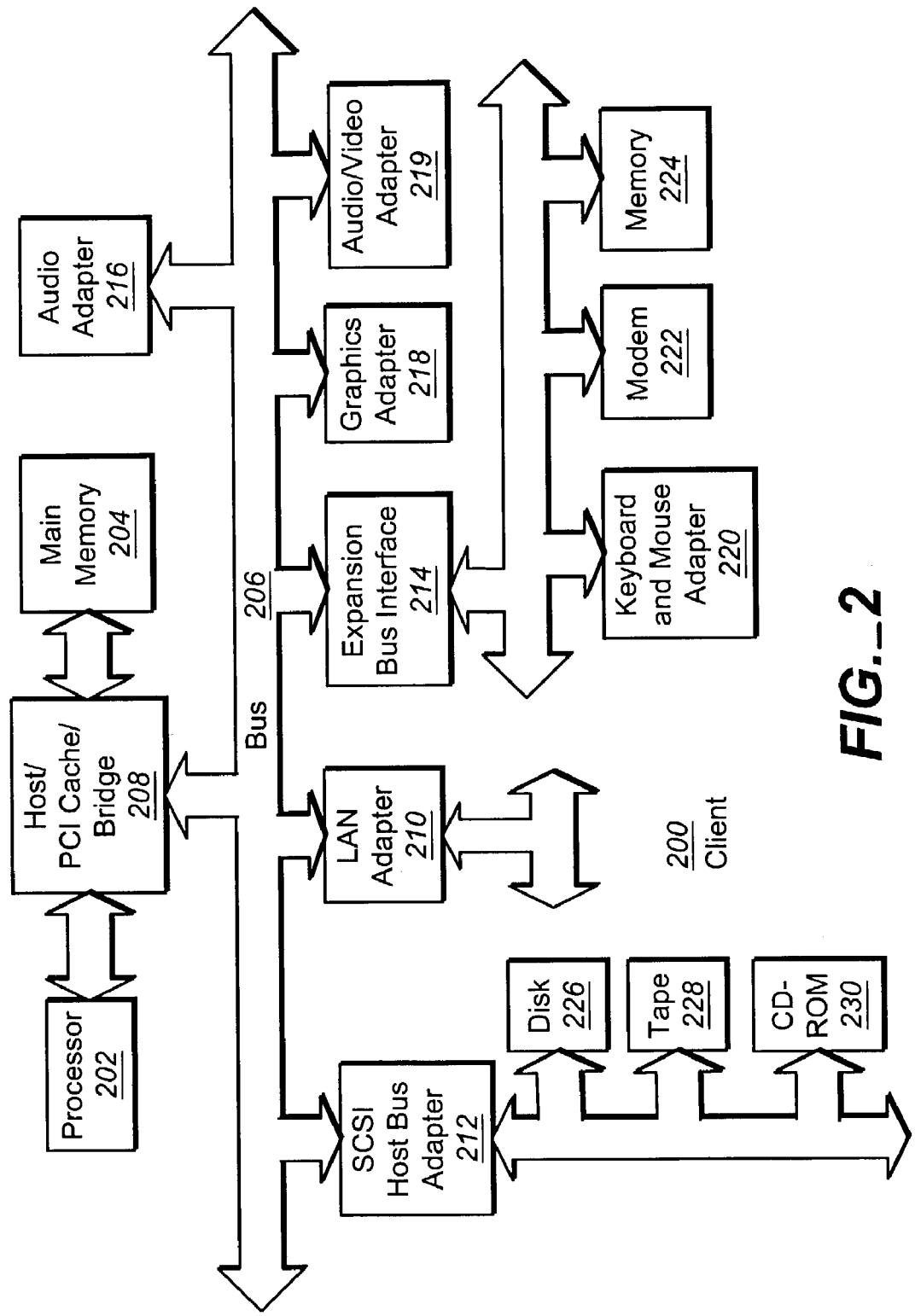
FIG._2

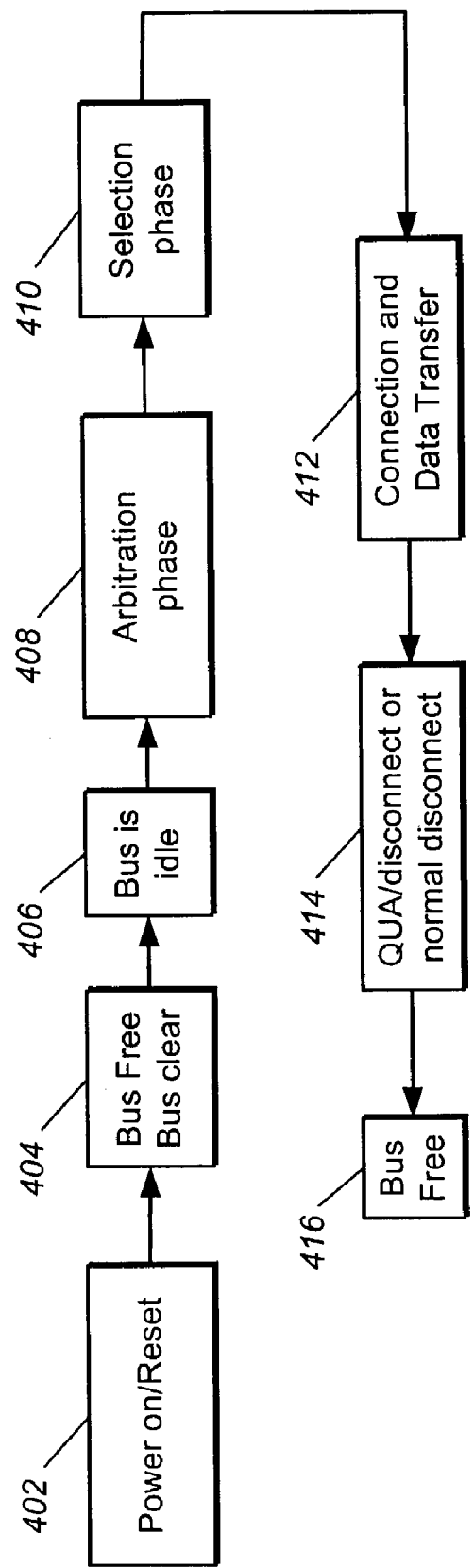
FIG._4

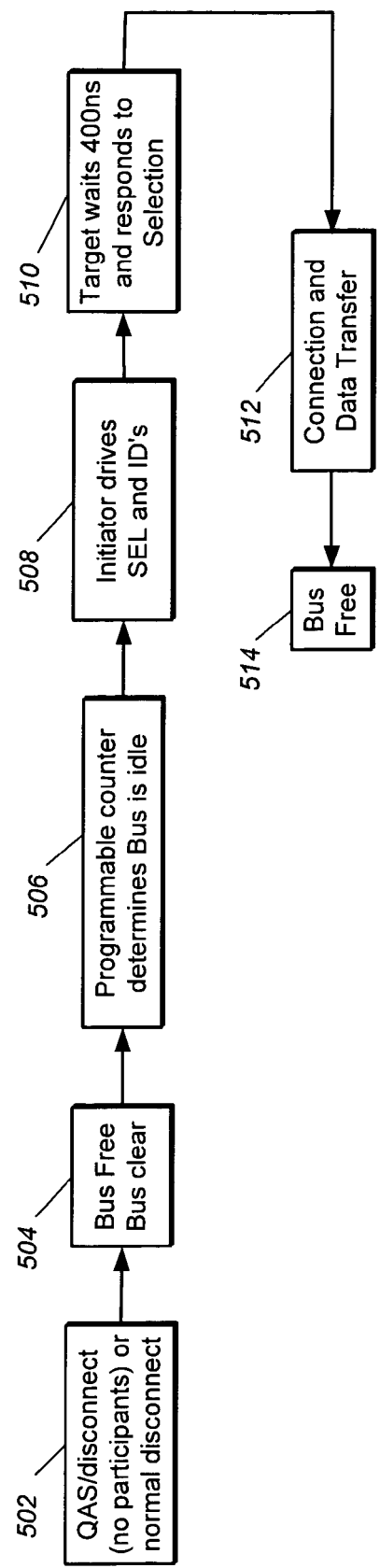
FIG._5

METHOD FOR IMPROVING SELECTION PERFORMANCE BY USING AN ARBITRATION ELIMINATION SCHEME IN A SCSI TOPOLOGY

BACKGROUND OF THE INVENTION

1. Technical Field

The present invention is directed generally toward a method and apparatus for improving performance in a SCSI (small computer system interface) topology; more particularly, the present invention is directed toward improving performance by eliminating the arbitration phase in some circumstances.

2. Description of the Related Art

The need for faster data access in SCSI topologies has grown due to faster processors and enhanced PCI bus architectures that increase data transfer rates using wider data paths and improved clock rates. During the time when the system is running, the SCSI bus is generally either active or idle. If active, the bus is busy transmitting data from one device to another; if idle, it is available for a device to begin sending a command or data. When a device decides it wants to use the bus, it "bids" for control of the bus. It is also possible that other devices on the bus will want to use it at the same time, so they too may "bid" for control. A specific method is used to resolve these requests and decide which device gets to use the bus first; this is based to some extent on the devices' respective priority levels. This process is called arbitration.

While arbitration works fine in regular SCSI configurations, it introduces overhead. During the time that arbitration is going on, no data is being transferred on the bus, so it makes sense that doing this faster will allow improved performance of the entire SCSI subsystem. To this end, the SPI-3 standard defined a feature that reduces the overhead required for arbitration. This feature is called quick arbitration and selection or QAS.

QAS reduces bus overhead by reducing the time required to implement arbitration on the bus compared to normal arbitration. When the feature is used, a device waiting for the bus can grab it more quickly after the last device on the bus sends the signal that it is done, without having to begin a normal arbitration process. Provision is made in the specification to ensure that one device does not "dominate" the bus by "unfairly" blocking out other devices that may be of a lower priority or may not implement QAS.

In current SCSI systems, SCSI applications must create an initiator/target connection through arbitration and selection. The normal arbitration period on a SCSI bus can only occur after a bus clear condition. The term "bus clear" refers to a point in time on the SCSI bus when the signal BSY (busy) and SEL (select) are both deasserted for a period of time (e.g., 400 ns in some current systems) indicating the bus is "free," plus an additional time span (e.g., another 800 ns) indicating the bus is "clear." After waiting for the bus clear condition, the bus is idle and normal arbitration can start. After the normal arbitration period has completed (e.g., 2.4 microseconds later in many current systems), the selection phase begins. After the connection is established, the data transfer takes place and the drive either does a QAS disconnect or a normal disconnect followed by a bus free condition.

Unless another generation of SCSI topology is developed, performance of SCSI interfaces must be improved by increasing the efficiency and speed with which current topologies perform their duties. Therefore, current data processing systems would benefit from improved data transfer rates that deliver valid data sooner after a data request, and from the elimination of some time usage associated with arbitration after bus inactivity.

SUMMARY OF THE INVENTION

The present invention delivers data more quickly after a data request by eliminating the arbitration phase on a SCSI bus in some circumstances. One example embodiment describes a system and method for improving selection performance by using an arbitration elimination scheme that can be used by applications commonly found in a parallel SCSI topology. In this embodiment, a bus free condition starts a counter to determine when the bus clear period of time has passed, which marks the start of the arbitration window for devices requesting the bus. In a preferred embodiment, the timer is programmable and is designed to extend a short time period into the arbitration window. If there is no activity on the bus (e.g., no device asserts BSY (busy)) then the initiator knows that the early portion of the arbitration window has passed with no participants. In other words, no devices are contending for the bus at that time, and arbitration for the bus is therefore not necessary. The initiator therefore eliminates the arbitration phase by asserting SEL (select) and issuing initiator and target IDs. The target waits a short duration after the SEL/IDs are asserted (e.g., a 400 ns delay is required in current systems to maintain signal integrity) and then the target asserts BSY to establish the connection. The initiator releases SEL and the data transfer begins. The connection completes in a normal fashion with a QAS disconnect or a normal disconnect, followed by a bus free condition.

Hence, the example embodiment delivers valid data sooner after a data request compared to a conventional SCSI topology by eliminating some time associated with unnecessary arbitration after bus inactivity.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 shows an overview of a computer system consistent with implementing a preferred embodiment of the present invention.

FIG. 2 shows a block diagram of a computer system consistent with implementing a preferred embodiment of the present invention.

FIG. 3 shows a block diagram showing a typical SCSI bus consistent with a preferred embodiment of the present invention.

FIG. 4 shows a process flow for a typical arbitration/selection scheme in a SCSI topology.

FIG. 5 shows the innovative process flow for implementing a preferred embodiment of the present invention.

DETAILED DESCRIPTION

With reference now to the figures and in particular with reference to FIG. 1, a pictorial representation of a data processing system in which the present invention may be implemented is depicted in accordance with a preferred embodiment of the present invention. A computer 100 is depicted which includes a system unit 102, a video display terminal 104, a keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

FIG. 3 shows an example of a parallel SCSI bus 302 with an initiator 304 and five target devices 306. Initiator 304 is a device that begins a SCSI transaction by issuing a command to another device (the SCSI target), giving it a task to perform. Typically a SCSI host adapter is the initiator but other targets or devices may also become initiators. Target 306 in this example is a disk drive, but a target can be any SCSI device that executes a command from a SCSI initiator to perform some task. Typically the target is a SCSI peripheral device but the host adapter can also be a target.

Current SCSI applications must create a connection between an initiator and a target through an arbitration and selection process. The arbitration period on a SCSI bus occurs only after a bus clear condition. The term bus clear refers to a point in time on a SCSI bus when the signals BSY (busy) and SEL (select) are both deasserted for 400 ns (i.e., the bus is free) plus an additional 800 ns (i.e., the bus is clear). After waiting for a bus clear condition, the bus is idle and arbitration can begin. In current systems, the arbitration period takes 2.4 microseconds, after which the selection phase starts. After the connection is established, the data transfer takes place and the drive either does a QAS disconnect or a normal disconnect followed by a bus free condition.

FIG. 4 shows a process flow for the arbitration and selection in a conventional SCSI topology. This example process starts with a power on/reset condition of the SCSI bus (step 402). This is followed by a bus free condition, wherein signals BSY and SEL are both deasserted for 400 ns, and a bus clear condition 800 ns later (step 404). The bus is "idle" at this point (step 406) and ready for the arbitration phase. Note that a timer mechanism of some kind is typically used to determine when these phases occur. The arbitration phase begins (step 408) which typically lasts 2.4 microseconds, followed by the selection phase (step 410). Once the connection is established, the data transfer occurs (step 412). After the data transfer, the device disconnects (step 414), followed by a bus free condition (step 416).

The present innovations include a method of selection that eliminates arbitration in common circumstances. It operates by allowing a check for arbitration participants during the early portion of an arbitration period, and if no arbitration participants are detected, arbitration is bypassed and the device can assert a connection to the initiator without the delay for the rest of the arbitration period. An example implementation of the invention is described in FIG. 5.

FIG. 5 shows an implementation of the innovative arbitration elimination scheme. The process begins with a QAS disconnect or a normal disconnect (step 502). This is followed by a bus free and bus clear period, as described above (step 504). In a preferred embodiment, after a bus free condition has occurred, a counter begins to determine when the bus clear period of time has passed. Of course, other mechanisms of determining when the arbitration window has opened may also be employed. Also in a preferred embodiment, the counter or timer is programmable and capable of extending a short period of time into the arbitration window. At the end of the bus clear period, the bus is idle (step 506). If there is no activity on the bus during the early portion of the arbitration window (i.e., no device has asserted BSY, then the initiator knows that the early portion of the arbitration window has passed with no participants. Thus, the initiator can eliminate the rest of the arbitration phase by asserting SEL and the initiator/target IDs (step 508). If any device at this point in time attempts to arbitrate, it sees SEL asserted and skips participating in arbitration. After the target waits 400 ns (for signal integrity) after the SEL and IDs are asserted (step 510), the target asserts BSY to establish the connection, the initiator releases SEL, and the data transfer begins (step 512). The connection then completes in a normal fashion with a QAS/disconnect or normal disconnect followed by a bus free (step 514).

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method of accessing a bus in a SCSI topology, comprising the steps of:
   determining when a bus clear period has passed and an arbitration period begins, wherein the arbitration period includes an early portion of the arbitration period and a rest of the arbitration period; and
   if the early portion of the arbitration period passes without participants, eliminating the rest of the arbitration period when a first device asserts control of the bus, wherein the early portion of the arbitration period that passes without participants is programmable.

2. The method of claim 1, wherein the first device asserts control of the bus by asserting SEL (select) and identifying the first device and a target.

3. The method of claim 1, wherein the first device is an initiator.

4. The method of claim 1, wherein the first device is a SCSI adapter.

5. A system for accessing a bus in a SCSI topology, comprising:
   a first device capable of initiating transactions on the bus, wherein an arbitration period for the bus includes an early portion of the arbitration period for the bus and a rest of the arbitration period for the bus; and
   a plurality of target devices capable of executing commands from the first device, wherein if no participants are detected during the early portion of the arbitration period for the bus, the first device asserts control of the bus eliminating the rest of arbitration period for the bus, and wherein the early portion of the arbitration period for the bus that passes without participants is programmable.

6. The system of claim 5, wherein a duration of the early portion of the arbitration period for the bus is determined by a timer, and wherein the timer is implemented as code.

7. The system of claim 6, wherein the timer is programmable.

8. The system of claim 5, wherein the first device asserts control of the bus by asserting SEL (select) and identifying the first device and a target device of the plurality of target devices.

9. The system of claim 5, wherein the firm device is a SCSI adapter.

10. The system of claim 5, wherein a programmable timer determines when the arbitration period for the bus begins.

11. A computer program product for accessing a bus in a SCSI topology, comprising:
   first instructions for determining when a bus clear period has passed and an arbitration period begins, wherein the arbitration period includes an early portion of the arbitration period and a rest of the arbitration period; and
   second instructions for, if the early portion of the arbitration period passes without participants, eliminating the rest of the arbitration period when a first device asserts control of the bus, wherein the early portion of the arbitration period that passes without participants is programmable.

12. The computer program product of claim 11, wherein the first device asserts control of the bus by asserting SEL (select) and identifying the first device and a target.

13. The computer program product of claim 11, wherein the first device is an initiator.

14. The computer program product of claim 11, wherein the first device is a SCSI adapter.

15. A system for accessing a bus in a SCSI topology, comprising:
   means for initiating transactions on the bus, wherein an arbitration period for the bus includes an early portion of the arbitration period for the bus and a rest of the arbitration period for the bus;
   means for executing commands related to the transactions;
   means for determining when the early portion of an arbitration period for the bus has passed without participants; and
   means for eliminating the rest of the arbitration period for the bus responsive to determining the early portion of the arbitration period for the bus has passed without participants, wherein the early portion of the arbitration period for the bus that passed without participants is programmable.

16. The system of claim 15, wherein the means for initiating transactions on the bus comprises a SCSI adapter.

17. The system of claim 15, wherein the means for executing commands related to the transactions comprises a plurality of target devices.

18. The system of claim 15, wherein the means for determining when the early portion of the arbitration period for the bus has passed without participants comprises a programmable counter.

* * * * *